Sept. 26, 1933.  P. GAUTHIER  1,928,530
SPRING TIRE
Filed Jan. 17, 1933    2 Sheets-Sheet 1
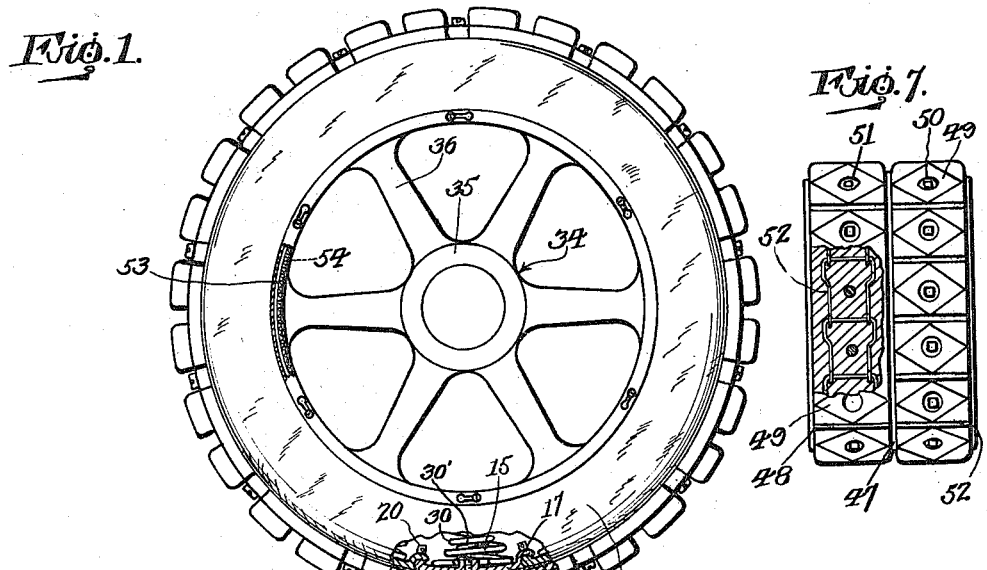
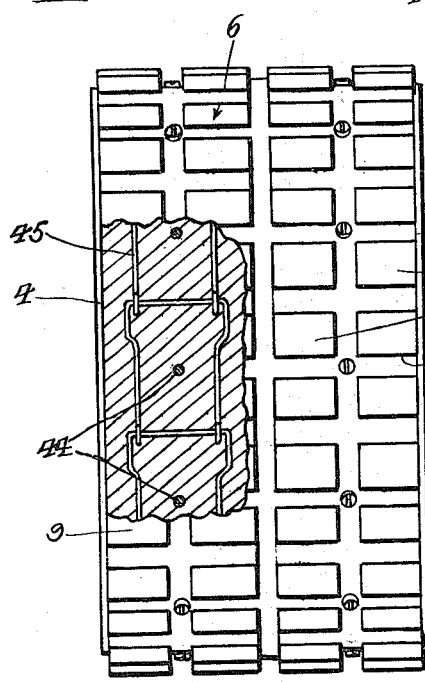
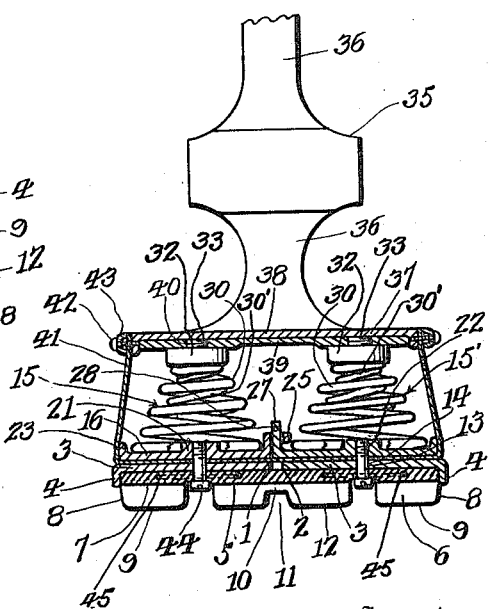
Inventor
Phibia Gauthier
By Geo. P. Kimmel
Attorney

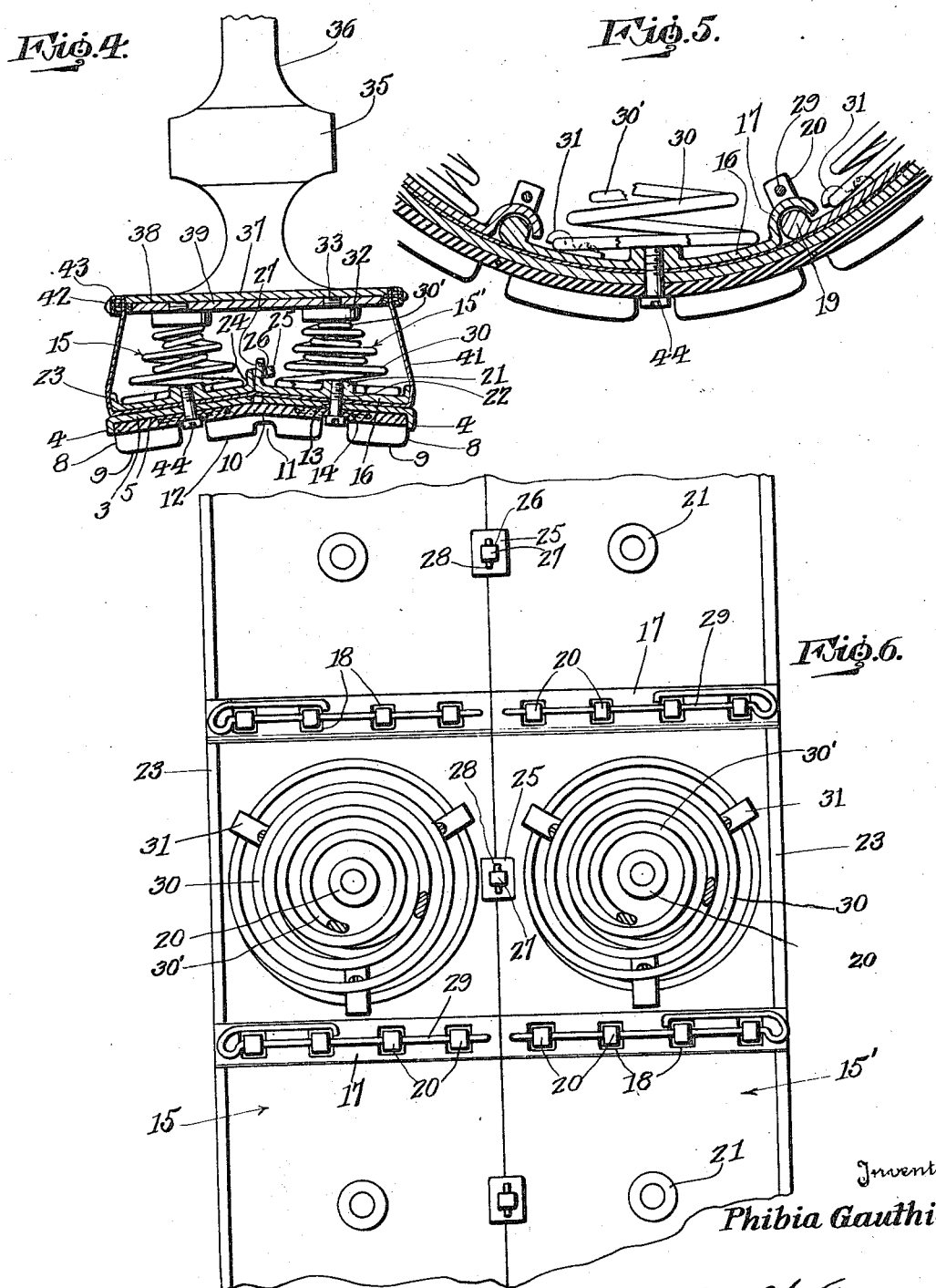

Patented Sept. 26, 1933

1,928,530

UNITED STATES PATENT OFFICE 1,928,530

SPRING TIRE

Phibia Gauthier, Lowell, Mass.

Application January 17, 1933. Serial No. 652,203

9 Claims. (Cl. 152—8)

My invention relates to resilient tires of the spring type, more particularly to an improvement upon the form of spring tire structure disclosed by Letters Patent No. 1,159,759 granted to me November 9, 1915, which not only embodies the objects and advantages of the construction of tire as set forth by the Letters Patent aforesaid, but has for its further object to provide, in a manner as hereinafter set forth, a spring tire structure including resilient jointed sections, with the joints between the sections arranged within the tire body, to prevent the impairment of the joints, when the tire is employed for traction purposes whereby the durability of the tire is materially enhanced.

A further object of the invention is to provide, in a manner as hereinafter set forth, a resilient tire structure, of the spring type, including a wide tread surface so formed as to reduce the skidding thereof to a minimum.

A further object of the invention is to provide, in a manner as hereinafter set forth, a sectional resilient tire structure possessing a cushioning characteristic whereby the latter will not be impaired in case of puncture thereby overcoming the objections now present in the form of pneumatic tire now generally used.

A further object of the invention is to provide, in a manner as hereinafter set forth, a resilient, sectional tire structure including a series of sections flexibly jointed together with each section having associated therewith a resilient element, and with the structure including means to protect the resilient elements from rusting and being clogged with dirt.

Further objects of the invention are to provide, in a manner as hereinafter set forth, a spring tire structure which is comparatively simple in its construction and arrangement, strong, durable, possessing a cushioning characteristic, thoroughly efficient in its use, readily repaired when occasion requires, quickly assembled, and comparatively inexpensive to manufacture.

To the above ends essentially, and to others which may hereinafter appear, the invention consists of such parts, and such combination of parts which fall within the scope of the invention as claimed.

In the drawings:

Figure 1 is a side elevation of a wheel showing the adaptation therewith of the spring tire structure, the latter being broken away and partly in section.

Figure 2 is an elevation looking towards the tread surface of the structure.

Figure 3 is a cross sectional view of the structure showing the sectional tread carrier in normal position.

Figure 4 is a view similar to Figure 3 with the sectional tread carrier shifted from normal.

Figure 5 is a fragmentary view in longitudinal section of the structure.

Figure 6 is a fragmentary view in plan looking towards the inner faces of the tread carriers.

Figure 7 is a front elevation partly in section of a modified form of tread element.

Figure 8 is a fragmentary view in side elevation of the modified form of tread element as applied to a wheel.

The spring tire structure includes a tread carrier formed of a pair of annular oppositely disposed sections 1, 2 of like form, each of which consists of a ring 3 having an outwardly directed annular flange 4 at its outer side. The inner edge of one ring opposes in spaced relation the inner edge of the other, and when so arranged the flanges 4 coact with the remaining portions of the rings to provide an annular groove 5 in which is mounted an annular tread element 6 formed of resilient material and consisting of a band 7, having its outer periphery provided with circumferentially extending spaced rows of spaced rectangular protuberances 8 forming antiskidding members 9. The protuberances 8 of one row are arranged in endwise opposed spaced alignment with those of an adjacent row. Arranged on the periphery of the band 7 between and spaced from the rows of protuberances 8 is a circumferentially extending row of spaced rectangular enlargements 10. Each of the latter is reduced at its center, as at 11 to form a pair of protuberances 12 for the same purpose as the protuberances 8. The enlargements 10 also provide reinforcements for the band 7 at the center thereof. The protuberances 12 are arranged in endwise opposed spaced alignment with the protuberances 8. The protuberances 8 and 12 are of greater thickness than the band 7, and the latter between the rows of protuberances 8 and the row of enlargements 10 is formed with spaced circumferential rows of openings 13 which register with openings 14 formed in the rings 3.

The spring tire also includes two opposed circular sets of resilient structures of arcuate contour in lengthwise section. The structures of one set are generally indicated at 15 and those of the other set at 15'. The structures of one set are oppositely disposed with respect to those of the other set. Each structure comprises a curved plate 16 provided at one end with an inwardly disposed lip 17 of semi-circular cross section and formed with a series of spaced transverse slots 18. The other end of the plate 16 is enlarged to form a rib 19 of substantially circular cross section and which extends inwardly with respect to the inner face of the plate. The rib 19 is formed with a series of spaced inwardly extending apertured lugs 20. The plate 16 centrally thereof is formed with a boss 21 and an opening 22 which extends through the body of the plate and the boss 21. The wall of opening 22 is threaded. The opening 22 aligns with an opening 14, the latter registering with an opening 13. The plate 16 has an inwardly extending outer edge flange 23 which extends from the lip 17 to the rib 19.

Each plate of a structure 15, centrally of its inner side is formed with an inwardly extending angle-shaped extension formed of a pair of arms 24, 25 extending at right angles to each other. The arm 25 is for overlapping a plate 16 of a structure 15' and has a slot 26 formed with beveled end walls. The slot is for the passage of an inwardly extending apertured lug 27 formed on the plate 16 of a structure 15' at the inner side of the latter. A cotter pin 28 extends through the lug 27 for joining the opposed inner sides of a pair of sidewise opposed structures 15, 15' together. A latching member 29 extends through lugs 20 of a rib for joining a pair of endwise opposed plate of either structure 15 or 15' together. The joints at the sides and ends of the plates are such as to permit of the flexing of one set of resilient structures relative to the other set. The joints between the ends of the plates of the structure of each set permit of the structures of each set flexing relatively to each other.

Each resilient structure further includes a pair of spiral springs 30, 30' of frusto-conical contour, the former having its outer or large end bearing against the inner face of plate 16. The spring 30' is arranged within and is of less length than spring 30. The latter has its largest coil, which is at the outer end thereof coupled to plate 16 by keepers 31. The inner or smallest end of spring 30 is mounted in a cup 32 having a peripherally threaded shank 33. The springs 30 provide for the ordinary load and the springs 30' are for the purpose of absorbing shocks or overloading. Each pair of springs provides what may be termed a combined cushioning and shock absorbing element forming a part of each resilient structure.

Each section of the tread carrier encompasses a circular set of resilient structures. The sections of the tread carrier are independently shiftable relatively to each other and is shifted by a resilient structure of a set.

With reference to Figures 1, 2 and 3, a wheel is generally indicated at 34 and the hub, spokes and rim thereof are indicated at 35, 36 and 37 respectively. The rim 37 is of channel-shape cross section and the channel 38 provided thereby opens outwardly. Seated in the channel 38 is a sectional annulus 39 formed with circumferentially extending spaced rows of openings 40 provided with threaded walls. Engaging with the wall of each opening is the shank 33 of a cup 32 whereby the latter is anchored stationary.

A flexible protecting covering or casing 41 is provided for the cushioning elements and the joints between the plates. The casing is interposed between the tread carrier and the two circular rows of plates, abuts the flanges 23 of plates 16 and the sides of the rim 37. Holdfast means 42 extend through the sides of casing 41 into the sides of the rim 37 to secure the casing to the latter. The holdfast means 42 projects laterally from the rim and has associated therewith a pair of holding rings 43 which bind the inner ends of the sides of the covering or casing against the sides of the rim. The holdfast means 42 and rings 43 are of the same form as referred to in my patent aforesaid.

The tread 6, tread carrier and resilient structures 15, 15' are connected together by spaced headed holdfast means 44 extending through registering openings 13, 14, the cover or casing 41 and engaging the walls of openings 22.

The tread element 6 includes a pair of sidewise opposed spaced annular chains 45, each consisting of yoke-shaped links pivotally connected together. The chains are embedded in the band 7 rearwardly of the protuberance 8 and enlargements 10. The pivoted ends 45' of the links are disposed transversely within band 7 to align with the space between certain of the protuberances 8 and these enlargements 10 endwise aligning with such protuberances as shown in Figures 1 and 2. The chains not only reinforce the tread element 6, but act to prevent the lateral extension of the latter.

With reference to Figures 7 and 8 a modified form of tread element 46 is shown and which consists of a band 47 provided with sidewise opposed spaced rows of spaced rectangular enlargements 48, each formed with a diamond-shaped protuberance 49 forming an anti-skid member. Each protuberance 49 has a central opening or recess 50 in which is arranged the head of a holdfast means 51 functioning for the same purpose as the holdfast means 44. The tread element 46 has embedded therein a pair of chains 52 for the same purpose and of the same construction as the chains 45. The pivoted ends of the links of the chains 52 are arranged within the band 47 to align with the spaces between lengthwise edges of the enlargements 48.

The inner ends of the sides of the covering or casing 41 are hemmed, as at 53. The hems have arranged therein annular springs 54 which function to maintain the cover against the sides of rim 37 and also prevent the sides of the covering from bunching and puckering.

What I claim is:—

1. A spring tire comprising a pair of opposed circular sets of independently shiftable resilient structures, said sets having coacting means for flexibly connecting them together at the sides thereof, the structures of each of said sets having coacting means for flexibly connecting them together at the ends thereof, a tread carrier formed of a pair of spaced sidewise opposed annular sections independently shiftable relatively to each other and each encompassing one of said sets, an annular tread element mounted in the outer faces of the sections of and extended from said carrier, said tread element being common to said sets, means for connecting said tread element, one of the sections of the carrier and one of said sets together, means for connecting said tread element, the other section of the carrier and each of the structures of the other of said sets together, and an annulus adapted to be mounted on a wheel rim, said annulus being common to said sets and secured thereto.

2. In a spring tire, two circular sets of resilient structures, each of the structures of each set having a slotted lip at one end and a rib at its other end formed with lugs for extending through the slotted lip of an adjacent structure, the rib and lugs of one structure coacting with the slotted lip of an adjacent structure for flexibly connecting the structures together, each of the structures of one set formed with an angle-shaped slot extension, each of the structures of the set formed with an apertured lug, said lugs coacting with said extensions for flexibly connecting the sets together, a two-part tread carrier, each part encompassing one of said sets, a tread element mounted in the carrier, and an annulus adapted to be mounted on a wheel rim, said annulus being common to and having said sets of structures bearing thereagainst.

3. In a spring tire, a pair of sidewise opposed independently shiftable sets of resilient structures, each set arranged in a circular row, the structures of each set having inwardly arranged means for flexibly connecting them together at the ends thereof and inwardly arranged means for flexibly connecting the inner sides of the structures of one set to the inner sides of the structures of the other set, a tread carrier formed of a pair of spaced independently shiftable annular parts, each arranged in encompassing position with respect to one of said sets, an annular resilient tread element mounted in the parts of the carrier and common to said sets, an annulus adapted to be mounted on a wheel rim, said annulus common to said sets, the structures of said sets bearing against said annulus, spaced means for connecting the tread element, one of the parts of said carrier and each of the structures of one of said sets together, and spaced means for connecting the tread element, the other of the parts of the carrier and each of the structures of the other of said sets together.

4. A spring tire comprising a pair of opposed circular sets of independently shiftable resilient structures, said sets having coacting means for flexibly connecting them together in sidewise opposed relation, the resilient structures of each of said sets having coacting means for flexibly connecting them together at the ends thereof, an annular tread carrier formed of a pair of spaced sidewise opposed sections independently shiftable relatively to each other, each encompassing one of the structures of one of said sets, an annular endless tread element mounted in and extended from the sections of the carrier and common to the said sets, spaced radially disposed holdfast devices arranged circumferentially with respect to said tread element and each having its inner end anchored to a structure of one set for connecting said tread element, one of the sections of the carrier and the structures of said set together, spaced radially disposed holdfast devices arranged circumferentially of said tread element and each having its inner end anchored to a structure of the other set for connecting said tread element, the other section of the carrier and the structure of said other set together, an annulus adapted to be mounted on a wheel rim, said annulus being common to said sets and secured thereto, and a protecting element interposed between the carrier and said structures, opposing the outer sides of the latter and connected with the sides of said annulus.

5. A spring tire comprising a pair of sidewise opposed flexibly connected sets of resilient structures arranged in a circular row, an annulus adapted to be mounted on a wheel rim, said annulus common to said sets and having said structures anchored at their inner ends therein, the structures of each set having coacting means for flexibly connecting them together, a tread element carrier formed of a pair of sidewise opposed annular parts, said parts arranged in spaced relation and each encompassing a set of resilient structures, an annular tread element mounted in and extended from the parts of said carrier and common to said sets, spaced means for connecting one of the parts of the carrier, one of said sets and said tread element together, spaced means for connecting the other part of the carrier, the other of said sets and tread element together, and a protecting element interposed between the carrier and said structures, opposing the outer sides of the latter and connected with the sides of said annulus.

6. In a spring tire, a tread carrier formed of a pair of edgewise opposed spaced annular parts, a pair of flexibly connected sidewise opposed circular sets of resilient structures adapted to be connected with and encompass a wheel rim, each of said parts being circumferentially disposed with respect to one of said sets, an annular tread element common to said sets and mounted in said parts, spaced rows of spaced holdfast devices arranged circumferentially with respect to said tread element, the holdfast devices of each row being disposed radially with respect to the axis of the tire, the holdfast devices of one row being anchored in the structures of one set and connecting the latter, one of said parts and a side portion of the tread element together, the holdfast devices of the other row being anchored in the structures of the other set and connecting the other of said parts and the other side of the tread element together, and a pair of sidewise opposed annular spaced resilient reinforcing members, each of said members being embedded in a side portion of said tread element.

7. In a spring tire, a pair of sidewise opposed circular sets of resilient structures, each of the structures of each set including a lengthwise curved plate formed at one end with an inwardly extending curved lip formed with a plurality of apertures and its other end with a rounded rib provided with aperture lugs, the lip of one plate overlapping the rib of an adjacent plate, the lugs of one plate extending through the apertured lip of an adjacent plate, a retaining member extending through the lugs of each plate and in connection with the lips and ribs flexibly connecting the plates together at their ends, the inner side of each of the plates of one set formed with an angle-shaped slotted extension, the inner side of each of the plates of the other set being formed with an apertured lug passing through a slotted extension, retainers extending through the apertures of and coacting with the lugs passing through said extensions and coacting with the latter for flexibly connecting said sets together, and a flexible tread structure anchored at said plates.

8. In a spring tire, a tread carrier formed of a pair of sidewise opposed spaced parts each in the form of an annulus, two circular sets of sidewise opposed resilient structures adapted to be disposed circumferentially with respect to a wheel rim, said structures having coacting means for flexibly connecting the inner side of the structures of one set to the inner side of the structures of the other set, the structures of each set having coacting means at their ends for flexibly connecting them together, each being encompassed by one of said parts, each of said parts having spaced openings, a tire element common to, mounted in and extended from said parts, two spaced sets of holdfast devices, one extending through said tread element, the openings in one of said parts and anchored to the structures of a set and the other extending through said tread element, the openings in the other of said parts and anchored to the structures of the other set of structures whereby said sets of structures, parts of said carrier and said tread element are connected together.

9. In a spring tire, a tread carrier formed of a pair of sidewise opposed spaced parts each in the form of an annulus, two circular sets of sidewise opposed resilient structures adapted to be disposed circumferentially with respect to a wheel rim, said structures having coacting means for flexibly connecting the inner side of the structures of one set to the inner side of the structures of the other set, the structures of each set having coacting means at their ends for flexibly connecting them together, each being encompassed by one of said parts, each of said parts having spaced openings, a tire element common to, mounted in and extended from said parts, two spaced sets of holdfast devices, one extending through said tread element, the openings in one of said parts and anchored to the structures of a set and the other extending through said tread element, the openings in the other of said parts and anchored to the structures of the other set of structures whereby said sets of structures, parts of said carrier and said tread element are connected together, a pair of spaced sidewise opposed annular reinforcing members, each embedded in a side portion of the tread element, and each set of holdfast devices extending through and spaced from the body of a reinforcing member.

PHIBIA GAUTHIER.